UNITED STATES PATENT OFFICE.

MOZES FRANZIE, OF THE HAGUE, NETHERLANDS.

PROCESS OF DESICCATING A FERMENTED CEREAL PRODUCT.

1,172,270.
Specification of Letters Patent.
Patented Feb. 22, 1916.

No Drawing.
Application filed April 8, 1915. Serial No. 20,101.

*To all whom it may concern:*

Be it known that I, MOZES FRANZIE, a subject of the Queen of the Netherlands, residing at 51 Louise de Colignystraat, The Hague, Netherlands, have invented certain new and useful Improvements in Processes of Desiccating a Fermented Cereal Product; and I do hereby declare the following to be a full, clear, and exact description of the invention, such as will enable others skilled in the art to which it appertains to make and use the same.

The present invention relates to a method of making a dried, imperishable and nutritious food product or food ingredient, wherein a cereal is subjected to the action of a fruit ferment, the cereal, such as rice or meal, containing albumin or fat, and the ferment being supplied by using bananas or other fruit such as mango and tamarind, or the extracts obtained therefrom.

In using rice and banana extract, the preferred method in accordance with my invention is as follows:—The rice is shelled and is boiled with about three times its volume of water. After a thorough cooking, the rice is cooled to a temperature of about 65° C., and is then mixed with the banana (plantain) extract. The mixture is allowed to ferment for a period of about at least 12 hours at a temperature no less than 50° C., the amylum or starch being decomposed and forming a product rich in sugar. Seventy-five per cent. of the water in the fermented product is extracted at a moderate rate by subjecting it to vacuum at a temperature not exceeding 40° C., which temperature is favorable for the action. The dried and fermented product is formed into thin sheets and is quickly heated to a temperature between 75° C. and 80° C., and kept at that temperature for several hours, in order to stop the fermenting action and to obtain a progressive drying action, whereupon the product is dried further at a slow rate and at a lower temperature. There is obtained a hard, brittle substance which is imperishable and of such nutritious and digestible nature as to be suitable for food for children. The substance may then be ground and sifted for distribution as a dried food. Instead of boiling the rice, it may be steamed, dried and powdered, and then mixed with the banana extract preparatory to the fermentation operation. Furthermore, the rice may be ground and sifted and then mixed with dried ferment or with dried fruit containing the ferment.

Although I prefer to use rice, other cereals may be used, also such ones containing albumin or fat in greater or less proportion, with the object to form food containing besides the products of fermentation also more or less albumin and (or) fat; and instead of using the extract of bananas or other fruits containing amylum-decomposing ferments, either in a dried or fresh state, the amylum-decomposing ferment itself may be used.

In making the food product or food ingredient in any of the ways disclosed in the foregoing, I have found that it is essential in producing an imperishable product of this kind to dry the product after the fermentation stage at a moderate rate, either by mechanical means or by chemical means. If the fermented product is dried slower than indicated in the foregoing, the pap is spoiled and becomes unsuitable as a food product or food ingredient; and on the other hand, if the fermented product is dried more quickly than indicated, there is obtained a tough and sticky substance which is perishable.

Having thus described my invention, what I claim is:

1. The process of making a dried and imperishable food product from a cereal, which consists in subjecting the treated cereal to the fermenting action of a fruit ferment, and then drying the product at a moderate rate.

2. The process of making a dried and imperishable food product from a cereal, which consists in subjecting the treated cereal to the fermenting action of banana extract, and then drying the product at a moderate rate.

3. The process of making a dried and imperishable food product from a cereal, which consists in subjecting the treated cereal to the fermenting action of a fruit ferment, and then drying the product in a vacuum at a temperature less than 40° C.

4. The process of making a dried and imperishable food product from a cereal, which consists in boiling the cereal, subjecting the treated cereal to the fermenting action of a fruit ferment, and then drying the product at a moderate rate.

5. The process of making a dried and imperishable food product from a cereal, which consists in boiling the cereal, subjecting the boiled cereal to the fermenting action of a fruit ferment, drying the product at a moderate rate, then heating the dried product to a temperature between 75° C. and 80° C., and then slowly drying the heated product at a lower temperature.

6. The process of making a dried and imperishable food product, which consists in treating rice with banana extract, and then drying the product at a moderate rate.

7. The process of making a dried and imperishable food product, which consists in boiling rice, subjecting the boiled rice to the fermenting action of banana extract, then drying the product in a vacuum at a temperature less than 40° C., then heating the dried product to a temperature between 75° C. and 80° C., and then slowly drying the product at a lower temperature.

8. The process of making a dried and imperishable food product from a cereal, which consists in subjecting the treated cereal to the fermenting action of banana pulp, and then drying the product at a moderate rate.

In testimony whereof I affix my signature in presence of two witnesses.

MOZES FRANZIE.

Witnesses:
A. C. GEBLAW,
H. VERMAADE.